United States Patent
Chiang (10) Patent No.: US 10,281,802 B2
(45) Date of Patent: May 7, 2019

(54) CONNECTING MODULE AND SYSTEM USING THE SAME

(71) Applicant: ABILITY ENTERPRISE CO., LTD., New Taipei (TW)

(72) Inventor: Cheng-Nan Chiang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 611 days.

(21) Appl. No.: 14/955,025

(22) Filed: Nov. 30, 2015

(65) Prior Publication Data
US 2016/0230796 A1 Aug. 11, 2016

(30) Foreign Application Priority Data
Feb. 11, 2015 (TW) .............................. 104104513 A (51) Int. Cl.
| | |
|---|---|
| F16B 5/10 | (2006.01) |
| F16B 7/20 | (2006.01) |
| G02B 7/20 | (2006.01) |
| G02B 7/14 | (2006.01) |
| G03B 17/14 | (2006.01) |
| G02B 7/02 | (2006.01) |

(52) U.S. Cl.
CPC ................ *G03B 17/14* (2013.01); *F16B 5/10* (2013.01); *F16B 7/20* (2013.01); *G02B 7/022* (2013.01); *G02B 7/023* (2013.01); *Y10T 403/7007* (2015.01)

(58) Field of Classification Search
CPC ........ G02B 7/022; G02B 7/026; G03B 17/14; F16B 5/10; F16B 7/20; H04N 5/2254; Y10T 403/32254; Y10T 403/32426; Y10T 403/7005; Y10T 403/7009; Y10T 403/7073; Y10T 403/7007
USPC ................ 403/83, 104, 348, 350, 375, 349; 396/530
See application file for complete search history.

(56) References Cited

U.S. PATENT DOCUMENTS

| | | | | |
|---|---|---|---|---|
| 5,644,441 A | * | 7/1997 | Hirasaki ................ | G02B 7/022 359/827 |
| 5,748,999 A | * | 5/1998 | Ueda ...................... | G03B 17/14 396/91 |
| 7,768,727 B2 | | 8/2010 | Iida | |

(Continued)

FOREIGN PATENT DOCUMENTS

| CN | 101493564 A | 7/2009 |
|---|---|---|
| CN | 2013-27599 Y | 10/2009 |

(Continued)

OTHER PUBLICATIONS

Chinese Office Action dated Mar. 9, 2018.

*Primary Examiner* — Josh Skroupa
(74) *Attorney, Agent, or Firm* — Rabin & Berdo, P.C.

(57) ABSTRACT

The connecting module is converted to a third state from a first state through a second state. The connecting module includes a fourth part, a first part, a second part and a third part, which are sequentially disposed in an axial direction. The first part is fixed to the third part. From the first state to the third state, the fourth part rotates together with the first part. From the first state to the second state, the first part rotates with respect to the second part, and the second part moves with respect to the third part in the axial direction.

21 Claims, 8 Drawing Sheets

(56) References Cited

U.S. PATENT DOCUMENTS

| | | | |
|---|---|---|---|
| 8,602,899 B2* | 12/2013 | You | B25B 23/0035 |
| | | | 464/36 |
| 9,578,970 B2 | 2/2017 | Besler et al. | |
| 2016/0252700 A1* | 9/2016 | Lamontagne | G02B 7/003 |
| | | | 359/827 |

FOREIGN PATENT DOCUMENTS

| | | | | |
|---|---|---|---|---|
| CN | 2014-87031 U | 5/2010 | | |
| CN | 203796737 U | 8/2014 | | |
| EP | 3094212 A1 | 11/2016 | | |
| JP | 2005-249067 A | 9/2005 | | |
| JP | 2013235074 A | * 11/2013 | ............. | G03B 17/14 |

* cited by examiner

CONNECTING MODULE AND SYSTEM USING THE SAME

This application claims the benefit of Taiwan application Serial No. 104104513, filed Feb. 11, 2015, the subject matter of which is incorporated herein by reference.

BACKGROUND

Technical Field

The invention relates in general to a connecting module and a system using the same, and more particularly to a connecting module capable of connecting two devices and a system using the same.

Description of the Related Art

In response to the current trend of slimness, lightweight and compactness and price reduction, the manufacturers normally appeal to simple functions and provide simplified devices. Occasionally, the users expect higher efficiency of a device. Under such circumstance, a connecting module can be used to connect an external device to improve the efficiency of the device.

However, to connect two devices in accordance with a mechanism, firstly, the two devices must be steadily connected. That is, the connecting structure between the two devices must be robust, and the clearance of the connecting interfaces between the two devices must be reduced to a minimum. On the other hand, if one or both of the two devices is too heavy, the force applied to the connecting interfaces will be uneven, making the structure between the connecting interfaces easily deformed and the two coupled devices relatively offset.

Therefore, it has become a prominent task for the industries to provide a new connecting module capable of steadily connecting two devices.

SUMMARY

The invention is directed to a connecting module and a system using the same capable of steadily assembling a number of elements of the system.

According to one embodiment of the present invention, a connecting module is provided. The connecting module is converted to a third state from a first state through a second state. The connecting module includes a fourth part, a first part, a second part and a third part, which are sequentially disposed in an axial direction. The first part is fixed to the third part. From the first state to the third state, the fourth part rotates together with the first part. From the first state to the second state, the first part rotates relative to the second part, and the second part moves relative to the third part in the axial direction.

According to another embodiment of the present invention, a connecting module is provided. The connecting module includes a first part, a second part, a third part and a fourth part, and an elastic element, which are disposed along an axial direction. The first part is disposed between the second part and the fourth part. The second part is disposed between the first part and the third part. The first part is fixed to the third part. The elastic element connects the first part and the fourth part.

According to an alternate embodiment of the present invention, a connecting module is provided. The connecting module is converted to a third state from a first state through a second state. The connecting module includes a first part, a second part, a third part, a fourth part and a fifth part. The first part is fixed to the third part. The second part is fixed to the fifth part. Between the first state and the second state, the second part rotates and offsets relative to the third part in an axial direction. Between the second state and the third state, the fourth part rotates relative to the first part, the second part, the third part and the fifth part.

According to another alternate embodiment of the present invention, a system is provided. The system includes a first device and one of the connecting modules disclosed above, wherein the fifth part is disposed on the first device.

According to another embodiment of the present invention, a system is provided. The system includes a second device and one of the connecting modules disclosed above, wherein the fourth part is disposed on the second device.

The above and other aspects of the invention will become better understood with regard to the following detailed description of the preferred but non-limiting embodiment(s). The following description is made with reference to the accompanying drawings.

DETAILED DESCRIPTION

Figure 1:
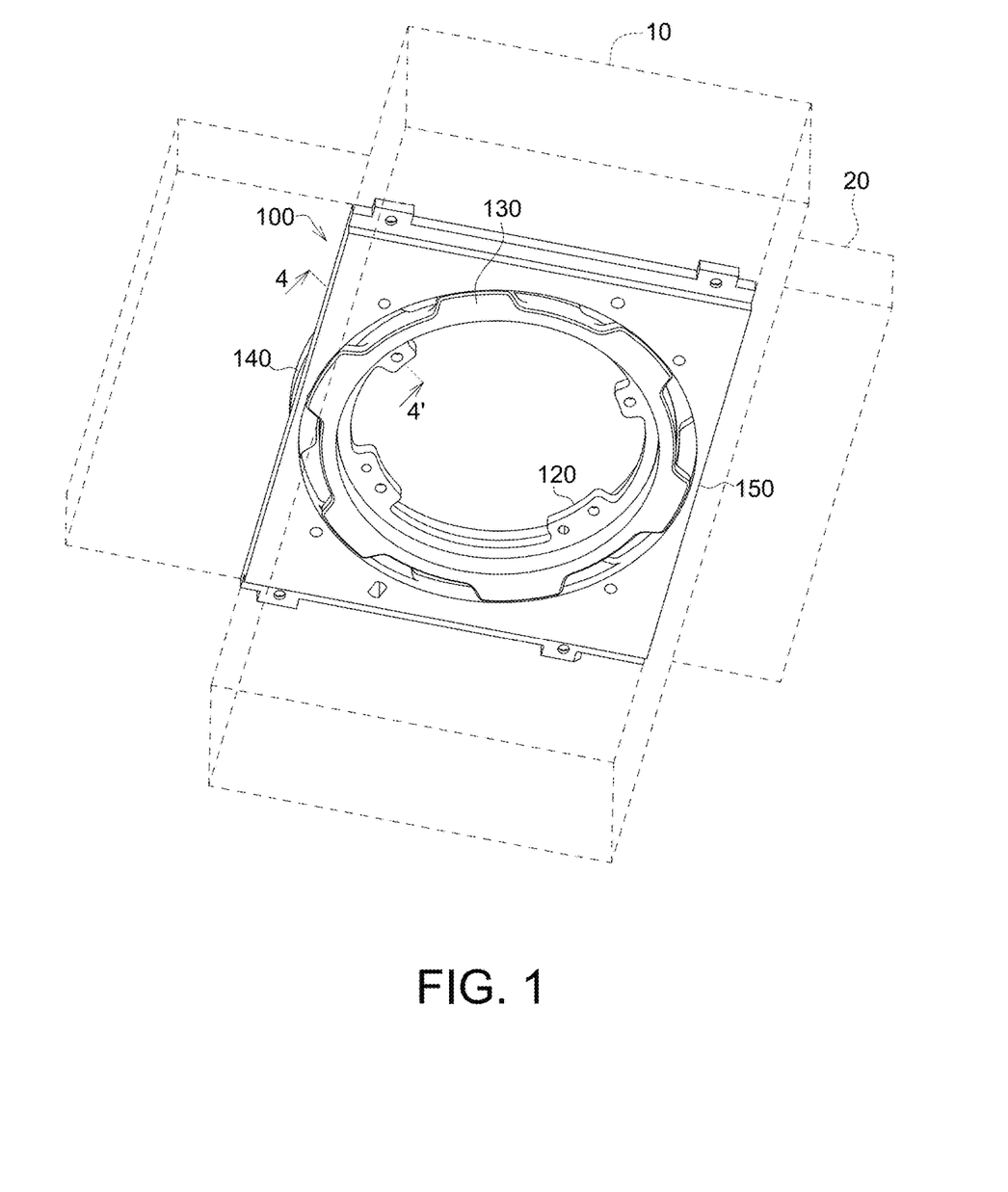
FIG. 1 is a schematic diagram of a connecting module of the present invention in a first state.
Figure 2:
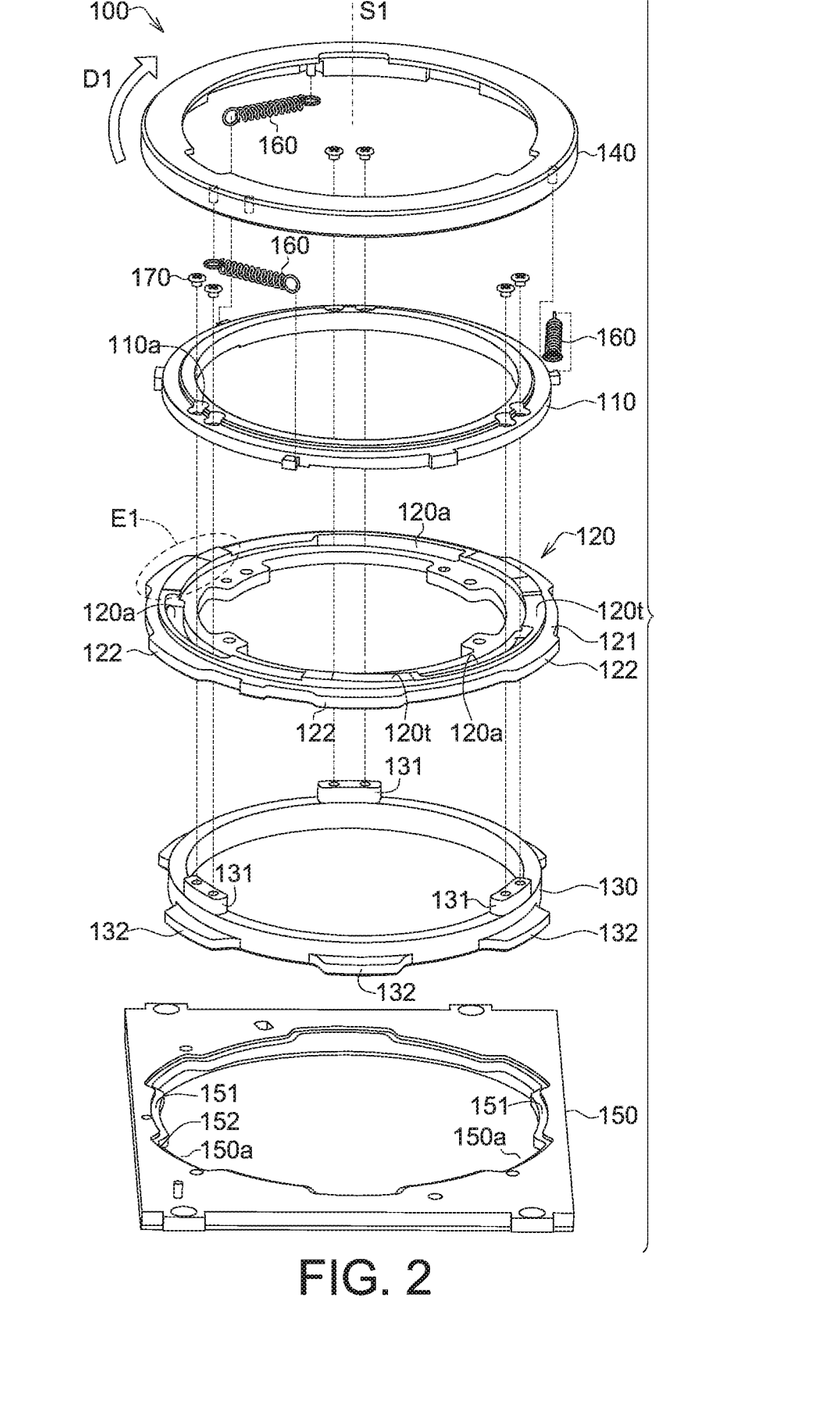
FIG. 2 is an explosion diagram of the connecting module of FIG. 1.

FIG. 1 is a schematic diagram of a connecting module 100 of the present invention in a first state. FIG. 2 is an explosion diagram of the connecting module of FIG. 1. As indicated in FIG. 1 and FIG. 2, the connecting module 100 includes a first part 110, a second part 120, a third part 130, a fourth part 140, a fifth part 150 and at least one elastic element 160. The connecting module 100 may be fixed on a first device 10 as a part or an assembly of the first device 10, and may be connected to the first device 10 in accordance with screws, locks, or buckles. The first part 110, the second part 120, the third part 130, the fourth part 140, and the fifth part 150 respectively form a hollowed ring structure.

Specifically, in an embodiment, the fifth part 150 may be fixed to a housing of the first device 10. In another embodiment, the fifth part 150 may be a part of the housing of the first device 10. That is, the fifth part 150 and the housing of the first device 10 may be integrally formed in one piece. Under such design, the connecting module 100 may be regarded as a part of the first device 10.

Besides, a second device 20 may be fixed to the connecting module 100 and may be locked with the first device 10 in accordance with the connecting module 100. In an embodiment, any part of the connecting module 100 may alternatively be disposed on or integrally formed in one piece with the second device 20. For example, the fourth part 140 may be disposed on the second device 20 or integrally formed in one piece with the second device 20 as a part of the housing of the second device 20. The first device 10 and the second device 20 may respectively be a mechanic device or an electronic device, such as a communication device, a housing or lens of an image capturing device, a portable computer, a large-sized machine tool, or an accessory such as an image capturing lens. In an embodiment, the first device 10 and/or the second device 20 and the connecting module 100 together may form a system.

Figure 3:
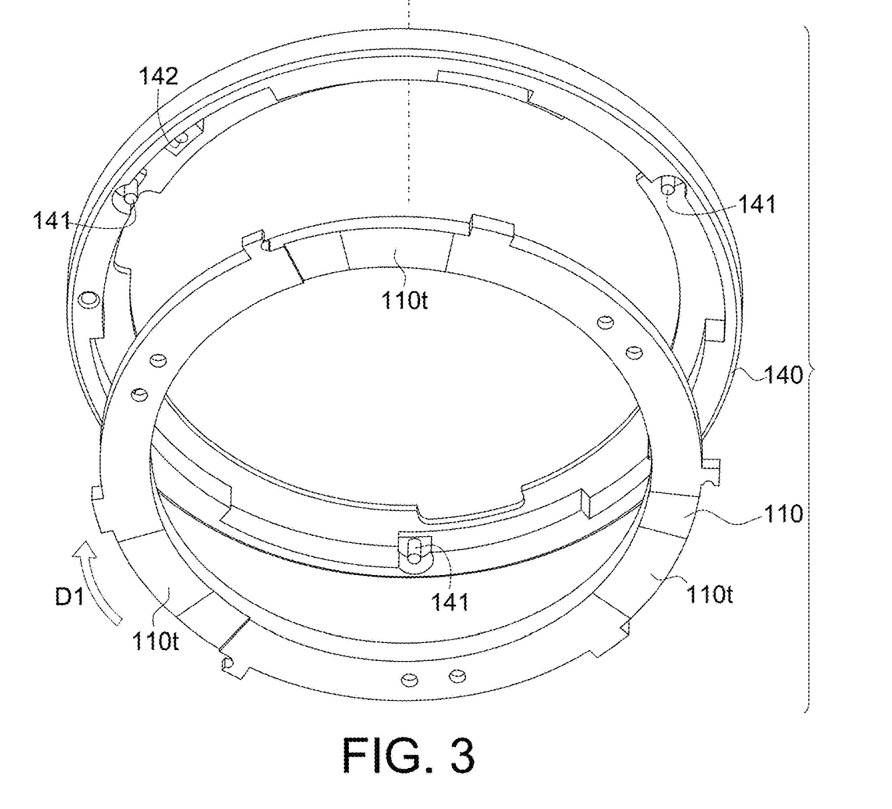
FIG. 3 is a bottom view of a first part and a fourth part of FIG. 2.

FIG. 3 is a bottom view of the first part 110 and the fourth part 140 of FIG. 2. As indicated in FIG. 2 and FIG. 3, the first part 110 includes at least one first contact surface 110*t*, and the second part 120 includes at least one second contact surface 120*t*. The first contact surface 110*t* is disposed on the circumferential of the first part 110 (not illustrated), and the second contact surface 120*t* is disposed on the circumferential of the second part 120 (not illustrated), wherein the first contact surface 110*t* and the second contact surface 120*t* both extend along an axial direction S1, and the first contact surface 110*t* and the second contact surface 120*t* may be disposed oppositely. Furthermore, during the process of the first part 110 rotating relative to the second part 120, the first contact surface 110*t* and the second contact surface 120*t* may abut each other. Besides, the third part 130 may move together with the first part 110. Moreover, the second part 120 may rotate with respect to the first part 110 and the third part 130, and may offset relative to the first part 110 and the third part 130 in the axial direction S1 in accordance with that rotation.

In other words, when the first part 110 rotates relative to the second part 120, the third part 130 may move along with the first part 110, such that the first part 110, the second part 120 and the third part 130 move relatively in the axial direction S1, thereby making the second part 120, the third part 130 and the fifth part 150 tightly engaged with each other.

As indicated in FIG. 2, the length of the first contact surface 110*t* extends in a rotational direction D1 such that the first contact surface 110*t* forms a bevel whose height gradually increases along the rotational direction D1. The length of the second contact surface 120*t* may also extend in the rotational direction D1 such that the second contact surface 120*t* forms a bevel whose height gradually increases along the rotational direction D1.

Specifically, at least one of the first contact surface 110*t* and the second contact surface 120*t* may be a bevel structure. That is, the first contact surface 110*t* changes its length extending towards the axial direction S1 according to the circumferential position of the first part 110, and/or the second contact surface 120*t* changes its length extending towards the axial direction S1 according to the circumferential position of the second part 120. In other words, the first contact surface 110*t* and/or the second contact surface 120*t* forms a bevel whose length gradually increases or decreases in the axial direction S1 according to the circumferential position of the first part 110 and/or the second part 120. Furthermore, the bevels of the first contact surface 110*t* and the second contact surface 120*t* abut each other in accordance with rotating relative to each other. Furthermore, since the first contact surface 110*t* and the second contact surface 120*t* push each other, the first contact surface 110*t* and the second contact surface 120*t* offset relative to each other in the axial direction S1. The quantity of the first contact surface 110*t* and the second contact surface 120*t* may be one or more than one. If the quantity of the first contact surface 110*t* and the second contact surface 120*t* is plural, the first contact surfaces 110*t* and the second contact surfaces 120*t* may be disposed on the first part 110 and the second part 120 respectively at an equal distance, but the present invention is not limited thereto.

In an embodiment, when the fourth part 140 rotates along the rotational direction D1, the fourth part 140 will drive the first part 110 to rotate. Under the circumstance that the first contact surface 110*t* and the second contact surface 120*t* rotate and push relative to each other, the first part 110 and the second part 120 will relatively offset in the axial direction S1, making the second part 120 and the third part 130 moving towards each other in the axial direction S1. If the fourth part 140 continues to rotate towards the rotational direction D1, the second part 120 and the third part 130 may be fixed to the fifth part 150.

As indicated in FIG. 2, the second part 120 may further include at least one penetrating portion 120*a*, and the third part 130 may further include at least one first protrusion 131. The first protrusion 131 may penetrate the penetrating portion 120*a* or be inserted inside the penetrating portion 120*a*.

In an embodiment, the length of the penetrating portion 120*a* may be larger than that of the first protrusion 131 and the width of the penetrating portion 120*a* may be larger than that of the first protrusion 131, making the third part 130 rotating relative to the second part 120 within the space provided by the penetrating portion 120*a*. The quantity of the first protrusion 131 and the penetrating portion 120*a* may be one or more than one. If the quantity of the penetrating portion 120*a* and the first protrusion 131 is plural, the penetrating portions 120*a* and the first protrusions 131 may be disposed on the second part 120 and the third part 130 respectively at an equal distance. On the other hand, the length of the penetrating portion 120*a* is substantially equivalent to the thickness of the second part 120 in the axial direction S1, but the present invention is not limited thereto.

After the first protrusion 131 penetrates the penetrating portion 120*a*, the first part 110 and the third part 130 may be fixed each other in accordance with a locking element 170 locked on the first protrusion 131 of the third part 130, such that the first part 110 and the third part 130 may be interlinked and may rotate and offset relative to the second part 120 at the same time.

However, the present invention is not limited to the above exemplifications. The first protrusion 131 may also disposed on the first part 110, such that after the first protrusion 131 of the first part 110 penetrates the penetrating portion 120*a* of the second part 120, the first part 110 and the third part 130 may be locked and fixed in accordance with the locking element 170.

Figure 4:
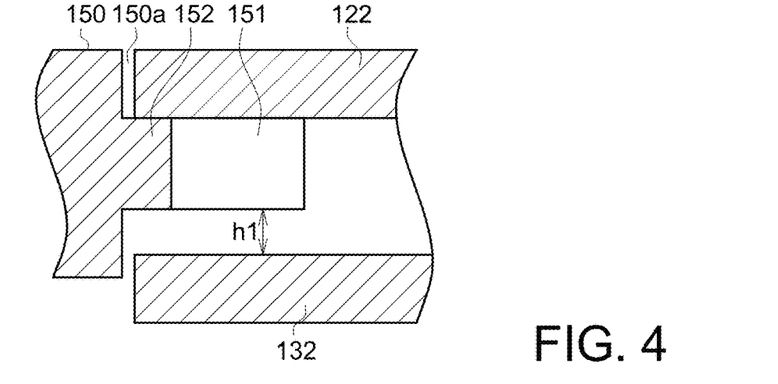
FIG. 4 is a partial cross-sectional view of the connecting module of FIG. 1 in a 4-4' direction.

FIG. 4 is a partial cross-sectional view of the connecting module 100 of FIG. 1 in a 4-4' direction. Refer to FIG. 2 and FIG. 4 at the same time. The second part 120 may further include at least one first abutting portion 121, and the third part 130 may further include at least one second abutting portion 132. The quantity of the first abutting portion 121 and the second abutting portion 132 may be one or more than one, and the quantity of the first abutting portion 121 may be the same as or different from that of the second abutting portion 132. If the quantity of the first abutting portion 121 and/or the second abutting portion 132 is plural, the first abutting portions 121 and/or the second abutting portions 132 may be disposed on the second part 120 and the third part 130 respectively at an equal distance, but the present invention is not limited thereto.

As indicated in FIGS. 2 and 4, the second part 120 further includes at least one engaging portion 122, which is disposed on the first abutting portion 121. Specifically, the engaging portion 122 may be protruded towards the radial direction substantially perpendicular to the axial direction S1. The fifth part 150 includes a first concave portion 150a, a first bearing portion 151 and/or a second bearing portion 152. The first concave portion 150a is disposed in the inner diameter of the fifth part 150, and penetrates the upper surface (not illustrated) and the lower surface (not illustrated) of the fifth part 150 in the axial direction S1. The first bearing portion 151 is formed at the junction between the inner diameter and the upper surface of the fifth part 150. The second bearing portion 152 is formed at the junction between the inner diameter and the upper surface of the first concave portion 150a. However, in another embodiment, the fifth part 150 may dispense with the second bearing portion 152, but the present invention is not limited thereto.

Refer to FIG. 1, FIG. 2 and FIG. 4 at the same time. During the assembly process, firstly, the second abutting portion 132 may be aligned with the first concave portion 150a, such that the third part 130 is placed in the fifth part 150. Then, the engaging portion 122 is aligned with the first concave portion 150a, such that the first abutting portion 121 and the engaging portion 122 of the second part 120 are disposed on the first bearing portion 151 and the second bearing portion 152 respectively. On the other hand, the size of the engaging portion 122 is smaller than that of the first concave portion 150a, and the outer diameter of the first abutting portion 121 is larger than the inner diameter of the fifth part 150, such that the second part 120 may be fixed in the first concave portion 150a of the fifth part 150 in accordance with the engaging portion 122 and may lean on the fifth part 150 in accordance with the first bearing portion 151 and/or the second bearing portion 152. According to such arrangement, the second part 120 and the fifth part 150 may abut each other but do not rotate relative to each other. The first bearing portion 151 and the second bearing portion 152 may form a continuous closed ring structure or a continuous open ring structure. Or, the first bearing portion 151 and/or the second bearing portion 152 may be formed of a number of separated protruding portions.

Refer to FIG. 1, FIG. 2 and FIG. 4. In the first state, the second abutting portion 132 of the third part 130 is placed inside the first concave portion 150a, and the engaging portion 122 of the second part 120 is placed on the first concave portion 150a and leans on the second bearing portion 152 at the same time.

Figure 2A:
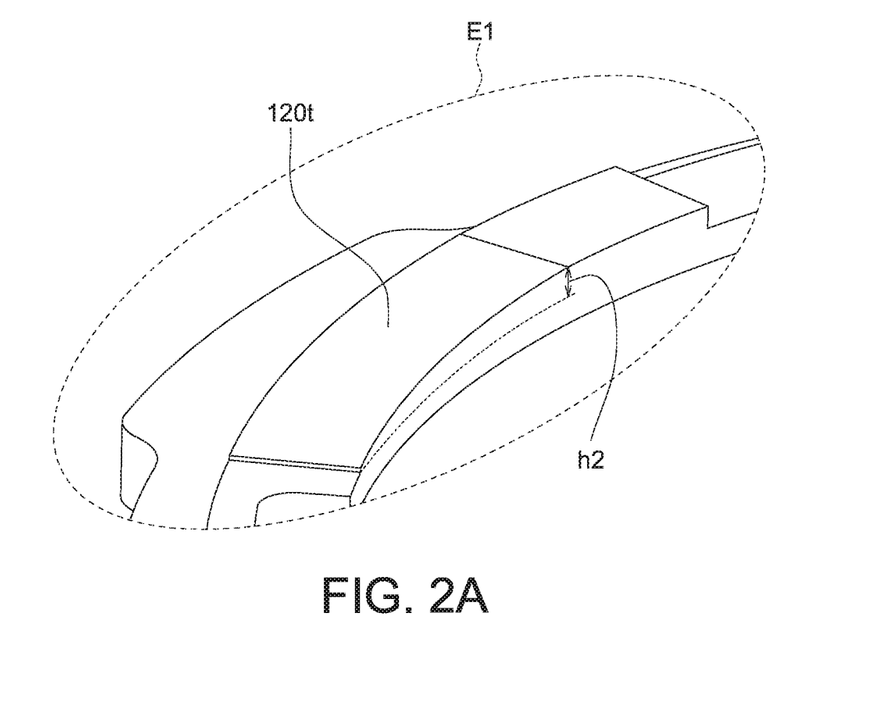
FIG. 2A is a partial enlarged view of a first portion of FIG. 2.

FIG. 2A is a partial enlarged view of a first portion E1 of FIG. 2. Moreover, refer to FIG. 2A and FIG. 4. In the first state, a clearance h1 is between the first bearing portion 151 and the second abutting portion 132. The bevel height h2 of the first contact surface 110t and the second contact surface 120t may be larger than the clearance h1.

Figure 5:
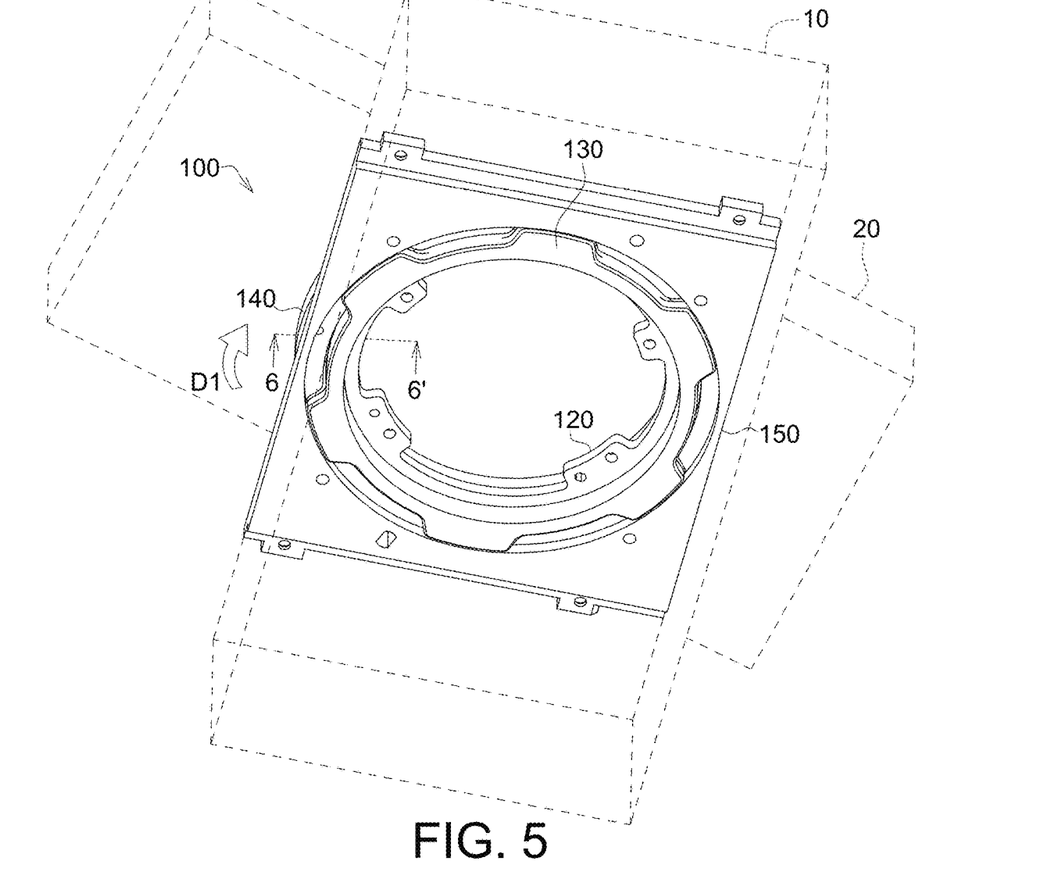
FIG. 5 is a schematic diagram of the connecting module of FIG. 1 in a second state.
Figure 6:
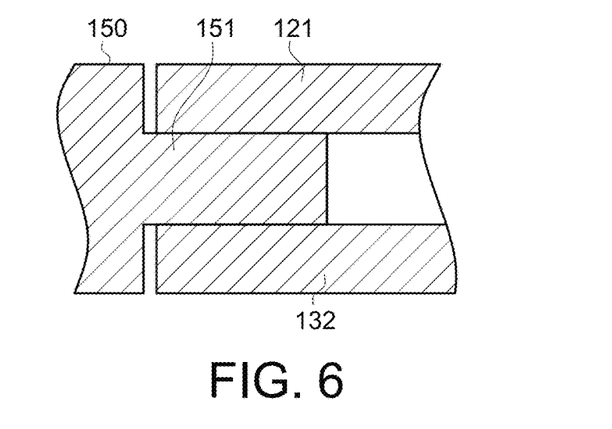
FIG. 6 is a cross-sectional view of the connecting module of FIG. 5 in a 6-6' direction.

FIG. 5 is a schematic diagram of the connecting module 100 of FIG. 1 in a second state. FIG. 6 is a cross-sectional view of the connecting module 100 of FIG. 5 in a 6-6' direction. The fifth part 150 is tightly disposed between the second part 120 and the third part 130.

Refer to FIG. 2 to FIG. 6. During the process of the connecting module 100 being converted from the first state to the second state, since the first contact surface 110t and the second contact surface 120t abut and rotate relative to each other, the second part 120 and the third part 130 move relatively in the axial direction S1, thereby making the distance between the second part 120 and the third part 130 shortened. Thus, the clearance h1 is reduced until the clearance h1 is substantially equal to 0. Meanwhile, the connecting module 100 is in the second state, the first bearing portion 151 is fixed between the first abutting portion 121 and the second abutting portion 132. The first abutting portion 121 of the second part 120 and the second abutting portion 132 of the third part 130 clamp the first bearing portion 151 of the fifth part 150 as indicated in FIG. 6.

Figure 7:
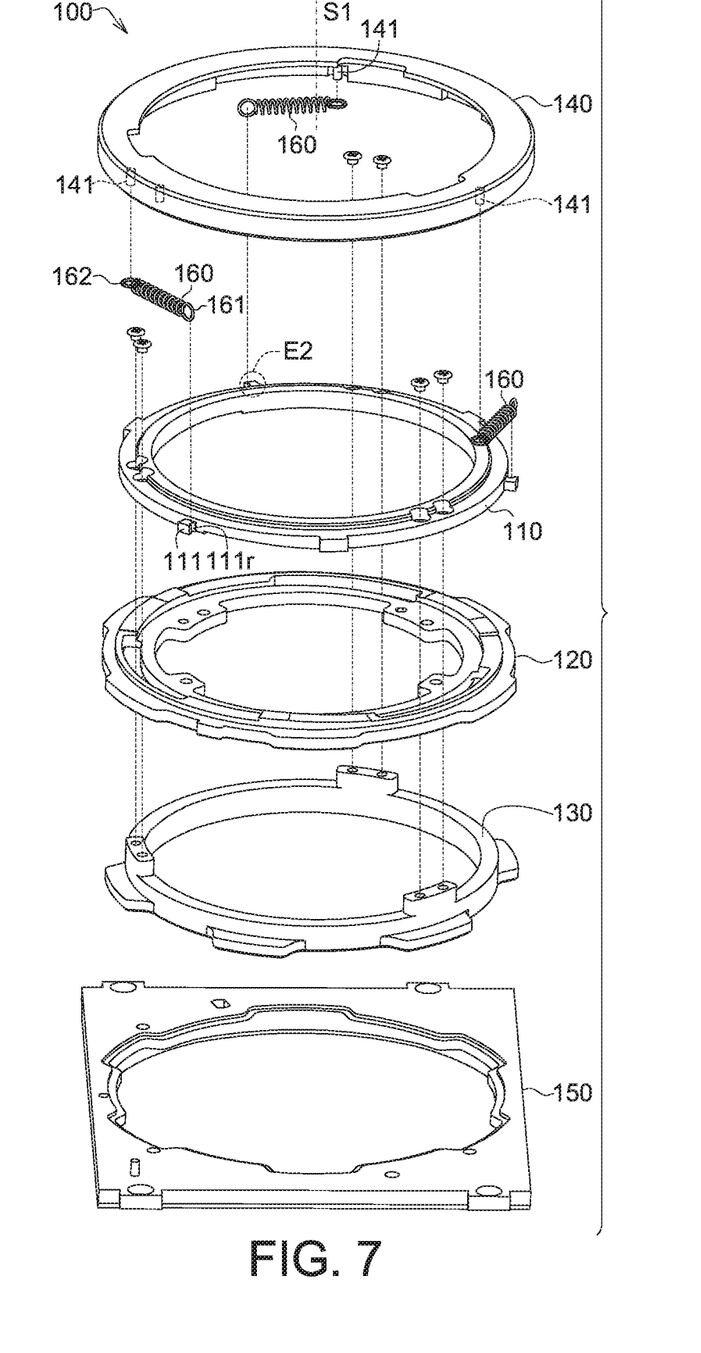
FIG. 7 is an explosion diagram of the connecting module of FIG. 5.

FIG. 7 is an explosion diagram of the connecting module 100 of FIG. 5. As indicated in FIG. 7, the elastic element 160 includes a first end 161 and a second end 162. The first part 110 includes at least one first engaging portion 111. The fourth part 140 includes at least one second engaging portion 141. The first end 161 and the second end 162 of the elastic element 160 are engaged with the first engaging portion 111 and the second engaging portion 141 respectively. Thus, when the fourth part 140 and the first part 110 rotate relative to each other, the fourth part 140 and the first part 110 may apply a pulling force to the elastic element 160 at the same time, and the elastic element 160 may be deformed by the pulling force of the fourth part 140 and the first part 110. The quantity of the first engaging portion 111 and the second engaging portion 141 may be one or more than one. If the quantity of the first engaging portion 111 and the second engaging portion 141 is plural, the first engaging portions 111 and the second engaging portions 141 may be disposed on the first part 110 and the fourth part 140 respectively at an equal distance, but the present invention is not limited thereto.

Figure 7A:
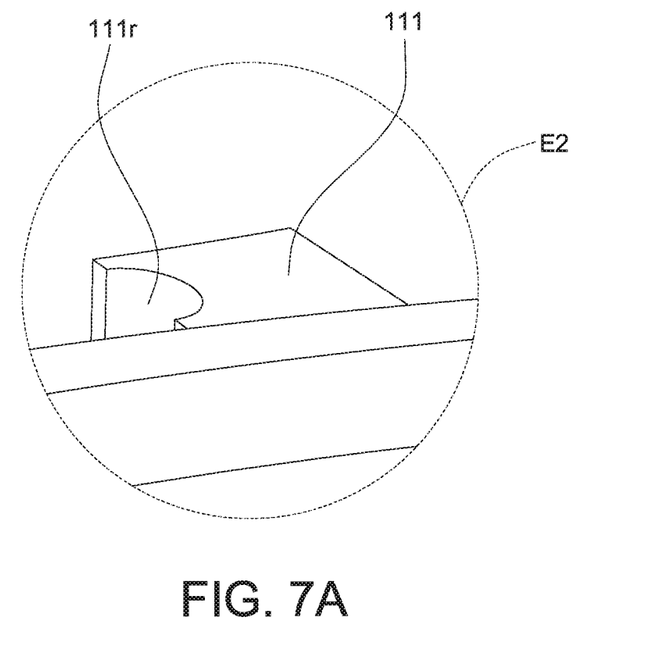
FIG. 7A is a partial enlarged view of a second portion of FIG. 7.

FIG. 7A is a partial enlarged view of a second portion E2 of FIG. 7. Specifically, as indicated in FIG. 7 and FIG. 7A, the first engaging portion 111 of the first part 110 includes a recess 111r for limiting the first end 161 of the elastic element 160. The second engaging portion 141 of the fourth part 140 may be a column extending towards the first part 110. The second end 162 of the elastic element 160 may be mounted on the second engaging portion 141.

On the other hand, in another embodiment, during the process of the connecting module 100 being converted from the first state to the second state, the fourth part 140 and the first part 110 may not rotate relative to each other, but during the process of the connecting module 100 being converted from the second state to the third state, the fourth part 140 and the first part 110 may rotate relative to each other.

Figure 8:
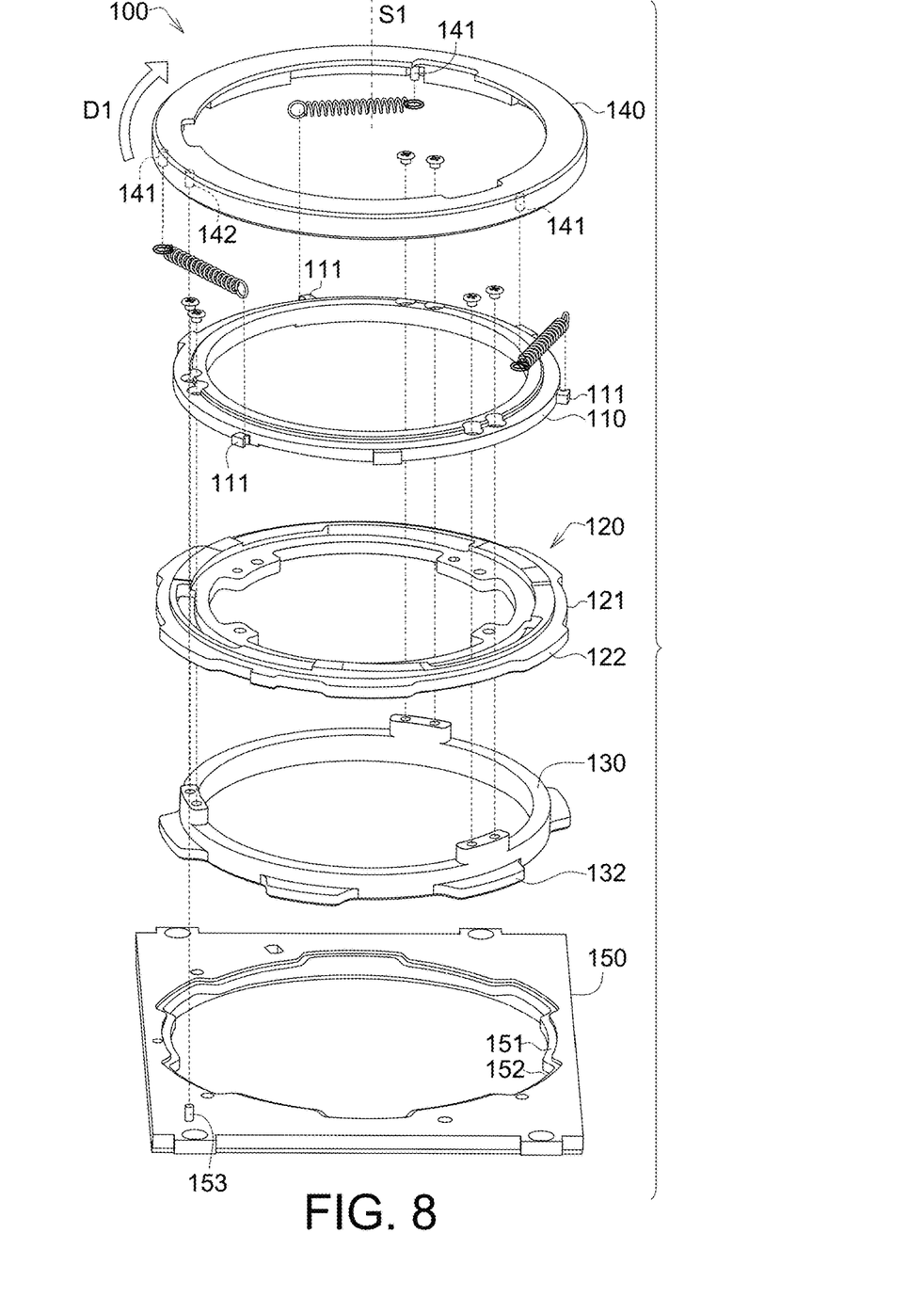
FIG. 8 is an explosion diagram of the connecting module of FIG. 1 in a third state.

FIG. 8 is an explosion diagram of the connecting module 100 of FIG. 1 in a third state. Refer to FIG. 6 and FIG. 8 at the same time. When the connecting module 100 is in the second state, the first abutting portion 121 of the second part 120 and the second abutting portion 132 of the third part 130 clamp the first bearing portion 151 of the fifth part 150. Meanwhile, a torque may be applied for enabling the fourth part 140 to rotate relative to the first part 110, such that the connecting module 100 may be being converted from the second state to the third state.

Specifically, in the third state, the fourth part 140 and the fifth part 150 may be engaged with each other in accordance with an concave portion and a protrusion, wherein the concave portion may be disposed on the fourth part 140, and the protrusion may be correspondingly disposed on the fifth part 150. Conversely, the concave portion may be disposed on the fifth part 150 and the protrusion may be correspondingly disposed on the fourth part 140, and the said exemplifications are not for limiting the present invention.

In an embodiment as indicated in FIG. 8, the fourth part 140 may further include a second concave portion 142, and the fifth part 150 may further include a second protrusion 153. During the process of the connecting module 100 being converted from the second state to the third state, the fourth part 140 and the first part 110 rotate relative to each other until the second protrusion 153 of the fifth part 150 is engaged in the second concave portion 142 of the fourth part 140. During the said process, the first part 110 and the fourth part 140 rotate relative to each other and may apply a pulling force to the elastic element 160, making the elastic element 160 pulled and deformed.

In short, when the connecting module 100 is between the first state and the third state, the fourth part 140 rotates relative to the second part 120 and the fifth part 150. When the connecting module 100 is in the third state, the fourth part 140 and the fifth part 150 are engaged with each other and fixed in accordance with the second concave portion 142 and the second protrusion 153.

Furthermore, suppose the fourth part 140 and the fifth part 150 are respectively fixed on the first device 10 and the second device 20. If the user wants to relieve the third state of the connecting module 100, the user can separate the second concave portion 142 from the second protrusion 153 such that the fourth part 140 may be detached from the fifth part 150 accordingly for lifting the fixing relationship between the first device 10 and the second device 20. Meanwhile, the elastic element 160 may release an elastic force for returning the fourth part 140 automatically. During the returning process of the fourth part 140, the fourth part 140 rotates in a direction inverse to the rotational direction D1, such that the first bearing portion 151 may be detached from at least one of the first abutting portion 121 and the second abutting portion 132. That is, the interfering state between the first abutting portion 121, the second abutting portion 132 and the first bearing portion 151 may be relieved.

The present invention further provides a system, which may include the connecting module 100 and the first device 10 of FIG. 1 to FIG. 8, and the fifth part 150 is disposed on the first device 10. Or, the system may include the connecting module 100 and the second device 20 of FIG. 1 to FIG. 8, and the fourth part 140 is disposed on the second device 20.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connecting module along an axis sequentially comprising:
   a fourth part;
   an elastic element;
   a first part, the first part and the fourth part applying a pulling force to the elastic element;
   a second part having a penetrating portion; and
   a third part;
   wherein the first part or the third part comprises a first protrusion, and the first part and the third part are connected with each other in accordance with the first protrusion penetrating the penetrating portion;
   from a first state to a second state, the first part and the second part move relative to each other along the axis.

2. The connecting module according to claim 1, wherein from the first state to a third state, the fourth part rotates relative to the first part.

3. The connecting module according to claim 1, wherein from the first state to the second state, the first part rotates relative to the second part, and the second part moves relative to the third part along the axis.

4. The connecting module according to claim 1, wherein the first part comprises a first contact surface, the second part comprises a second contact surface, and the first contact surface and/or the second contact surface is a bevel.

5. The connecting module according to claim 1, further comprising a fifth part having a first concave portion, wherein the second part has an engaging portion.

6. The connecting module according to claim 5, wherein the second part further comprises a first abutting portion, the third part comprises a second abutting portion, and the fifth part further comprises a first bearing portion disposed between the first abutting portion and the second abutting portion.

7. The connecting module according to claim 1, further comprising a fifth part, wherein the fourth part has one of a second concave portion and a second protrusion, and the fifth part has the other of the second concave portion and the second protrusion.

8. A system, comprising a first device, the connecting module according to claim 1 and a fifth part, wherein the fifth part is disposed on the first device.

9. A system, comprising a second device and the connecting module according to claim 1, wherein the fourth part is disposed on the second device.

10. A connecting module, comprising:
    a first part;
    a second part having a penetrating portion;
    a third part, wherein the second part is disposed between the first part and the third part;
    a fourth part, wherein the first part is disposed between the second part and the fourth part; and
    an elastic element connecting the first part and the fourth part;
    wherein the first part or the third part comprises a first protrusion, and the first part and the third part are connected with each other in accordance with the first protrusion penetrating the penetrating portion.

11. The connecting module according to claim 10, further comprising a fifth part having a first concave portion, wherein the second part has an engaging portion, and the second part and the fifth part are connected with each other in accordance with the engaging portion and the first concave portion.

12. The connecting module according to claim 11, wherein the second part further comprises a first abutting portion, the third part comprises a second abutting portion, and the fifth part further comprises a first bearing portion disposed between the first abutting portion and the second abutting portion.

13. The connecting module according to claim 10, further comprising a fifth part, wherein the fourth part has one of a second concave portion and a second protrusion, the fifth part has the other of the second concave portion and the second protrusion, and the fifth part and the fourth part are engaged with each other in accordance with the second concave portion and the second protrusion.

14. A system, comprising a first device, the connecting module according to claim 10 and a fifth part, wherein the fifth part is disposed on the first device.

15. A system, comprising a second device and the connecting module according to claim 10, wherein the fourth part is disposed on the second device.

16. A connecting module converted to a third state from a first state through a second state, wherein the connecting module comprises:
- a first part;
- a second part;
- a third part fixed to the first part;
- a fourth part;
- an elastic element, the first part and the fourth part applying a pulling force to the elastic element; and
- a fifth part fixed to the second part;
- wherein, between the first state and the second state, the second part and the third part rotate relative to each other about an axis and offset from each other along the axis; and between the second state and the third state, the fourth part rotates relative to the first part, the second part, the third part and the fifth part.

17. The connecting module according to claim 16, wherein the second part comprises a penetrating portion, the first part or the third part comprises a first protrusion, and the first part and the third part are fixed in accordance with the first protrusion penetrating the penetrating portion.

18. The connecting module according to claim 16, wherein the fourth part has one of a second concave portion and a second protrusion, the fifth part has the other of the second concave portion and the second protrusion, and in the third state, the second protrusion is engaged with the second concave portion.

19. The connecting module according to claim 16, wherein the second part further comprises a first abutting portion, the third part comprises a second abutting portion, and the fifth part further comprises a first bearing portion disposed between the first abutting portion and the second abutting portion.

20. A system, comprising a first device and the connecting module according to claim 16, wherein the fifth part is disposed on the first device.

21. A system, comprising a second device and the connecting module according to claim 16, wherein the fourth part is disposed on the second device.

* * * * *